(12) United States Patent
van der Meijden et al.

(10) Patent No.: US 12,454,298 B2
(45) Date of Patent: Oct. 28, 2025

(54) LIFT AND EXTRACTION SYSTEMS FOR AUTOMATIC SWIMMING POOL CLEANERS

(71) Applicant: ZODIAC POOL SYSTEMS LLC, Carlsbad, CA (US)

(72) Inventors: Hendrikus Johannes van der Meijden, Midrand (CA); David Holgreaves, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 356 days.

(21) Appl. No.: 18/094,510

(22) Filed: Jan. 9, 2023

(65) Prior Publication Data
US 2023/0219606 A1    Jul. 13, 2023

Related U.S. Application Data

(60) Provisional application No. 63/297,939, filed on Jan. 10, 2022.

(51) Int. Cl.
*B66F 7/00* (2006.01)
*B62B 1/06* (2006.01)
*B62B 1/12* (2006.01)
*B62B 1/14* (2006.01)
*E04H 4/16* (2006.01)

(52) U.S. Cl.
CPC .................. *B62B 1/14* (2013.01); *B62B 1/06* (2013.01); *B62B 1/12* (2013.01); *B62B 2202/50* (2013.01); *B62B 2206/003* (2013.01); *E04H 4/1654* (2013.01)

(58) Field of Classification Search
CPC ...... B66F 7/00; B66F 7/10; B66F 5/04; B66F 5/00; B62B 1/14; B62B 1/12
See application file for complete search history.

(56) References Cited

U.S. PATENT DOCUMENTS 2,744,762 A  *  5/1956  Kirk .......................... B62B 1/00
                                                      280/654
2,812,951 A     11/1957  Hanson
(Continued)

FOREIGN PATENT DOCUMENTS

DE    102018112651 A1    11/2019
KR       20130072476 A     7/2013
WO        2004000715 A2    12/2003

OTHER PUBLICATIONS

International Application No. PCT/US2023/010381, International Search Report and Written Opinion mailed on May 3, 2023, 14 pages.

(Continued)

*Primary Examiner* — Lee D Wilson
(74) *Attorney, Agent, or Firm* — Kilpatrick Townsend & Stockton LLP

(57) ABSTRACT

A lift and extraction system for an automatic swimming pool cleaner may facilitate removal from the of the automatic swimming pool cleaner from a swimming pool, deployment of the automatic swimming pool cleaner into a swimming pool, and/or storage of the automatic swimming pool cleaner outside of the swimming pool. The lift and extraction systems may include a frame, motive elements, and one or more engagement features for selectively engaging and positioning the automatic swimming pool cleaner relative to the frame.

12 Claims, 8 Drawing Sheets

(56) References Cited

U.S. PATENT DOCUMENTS

| | | | |
|---|---|---|---|
| 5,678,804 A * | 10/1997 | Lintelman | B66F 15/00 254/133 R |
| 8,771,504 B2 | 7/2014 | Mastio et al. | |
| 9,250,626 B2 | 2/2016 | Michelon | |
| 9,611,688 B1 | 4/2017 | Vanderbent, Jr. et al. | |
| 12,098,061 B2 * | 9/2024 | Hardin | B66F 15/00 |
| 2012/0018965 A1 * | 1/2012 | Hillier | G05G 1/04 74/519 |
| 2013/0223971 A1 * | 8/2013 | Grace, IV | B62B 1/14 414/809 |
| 2014/0137891 A1 | 5/2014 | Hanan et al. | |
| 2018/0327014 A1 | 11/2018 | Ferrell | |
| 2019/0023297 A1 | 1/2019 | Torrison | |
| 2021/0070337 A1 * | 3/2021 | Bowen, III | B62B 1/125 |
| 2023/0219606 A1 * | 7/2023 | van der Meijden | B62B 5/0089 254/8 R |

OTHER PUBLICATIONS

International Application No. PCT/US2023/010381, International Preliminary Report on Patentability mailed on Jul. 25, 2024, 9 pages.

* cited by examiner

LIFT AND EXTRACTION SYSTEMS FOR AUTOMATIC SWIMMING POOL CLEANERS

REFERENCE TO RELATED APPLICATION

This application claims the benefit of U.S. Provisional Patent Application No. 63/297,939, filed on Jan. 10, 2022, and entitled LIFT AND EXTRACTION SYSTEMS FOR AUTOMATIC SWIMMING POOL CLEANERS, the content of which is hereby incorporated by reference in its entirety.

FIELD OF THE INVENTION

This application relates to cleaning devices for water-containing vessels such as swimming pools and spas, among others, and more particularly, to lift and extraction systems for such cleaning devices.

BACKGROUND

Automatic swimming pool cleaners (APCs) are well known. These cleaners are often characterized as either "hydraulic" or "robotic" (or "electric"), depending on the source of their motive power. For example, hydraulic cleaners typically use pressurized or depressurized water to cause their autonomous movement within pools, while robotic cleaners typically use an electric motor to cause their movement. Moreover, hydraulic cleaners frequently are sub-categorized as either "pressure-side" or "suction-side" devices, where pressure-side cleaners receive pressurized water output from an associated water circulation pump while suction-side cleaners are connected to an inlet of the pump. APCs are often removed from a pool for servicing, storage after a cleaning operation, replacement, and/or for various other reasons as desired. However, APCs are heavy and are often difficult to remove from pools without requiring strenuous work from a user. Moreover, the heavy APCs may be difficult for a user to deploy back into the pool, and the APCs may be subject to damage (e.g., due to the user dropping it) during such deployment.

SUMMARY

Described herein are lift and extraction systems for APCs.

In certain embodiments, a lift and extraction system includes a frame, an engagement feature supported on the frame, and motive elements on the frame. The engagement feature may selectively engage the APC and position the APC relative to the frame In various embodiments, a lift and extraction system includes a frame and a lever arm supported on the frame. The lever arm may include a foot pedal and an engagement feature opposite the foot pedal. In certain embodiments, the lever arm is pivotable relative to the frame such that the engagement feature selectively engages the APC and positions the APC relative to the frame.

According to some embodiments, a lift and extraction system includes a frame and a lever arm pivotably supported on the frame. The lever arm may include a foot pedal and an engagement feature opposite the foot pedal, and the engagement feature may selectively engage the APC. In some embodiments, engagement of the foot pedal pivots the lever arm relative to the frame between a stowed position and a deployed position.

According to certain embodiments, a method of using a lift and extraction system includes causing the APC to engage with the lift and extraction system such that a drive motor of the APC lifts the APC out of a swimming pool.

In various embodiments, a lift and extraction system includes a frame and a lever arm supported on the frame. An end of the lever arm includes an engagement feature, and the lever arm is pivotable relative to the frame such that the engagement feature selectively engages the APC and positions the APC relative to the frame.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Described herein are lift and extraction systems (referred to herein as "lift systems") for APCs. The lift systems described herein may facilitate removal of an APC from a swimming pool, deployment of an APC into a swimming pool, and/or storage of the APC outside of the swimming pool. The lift systems described herein may include a frame, motive elements, and one or more engagement features for selectively engaging and positioning the APC relative to the frame. In certain embodiments, the lift systems described herein may facilitate access to portions of the APC, including but not limited to the filter basket, the pump, etc. In some cases, the lift systems described herein may be provided separately from an APC, although in other embodiments the lift systems and APCs may be initially provided together to a user. In some embodiments, the lift systems may not require moving parts for the extraction and/or deployment of the APC, although in other embodiments, the lift systems may include one or more movable components and/or portions of the system may be automated to facilitate extraction and/or deployment of the APC. Various other benefits and advantages may be realized with the lift systems described herein, and the aforementioned benefits and advantages should not be considered limiting.

Figure 1:
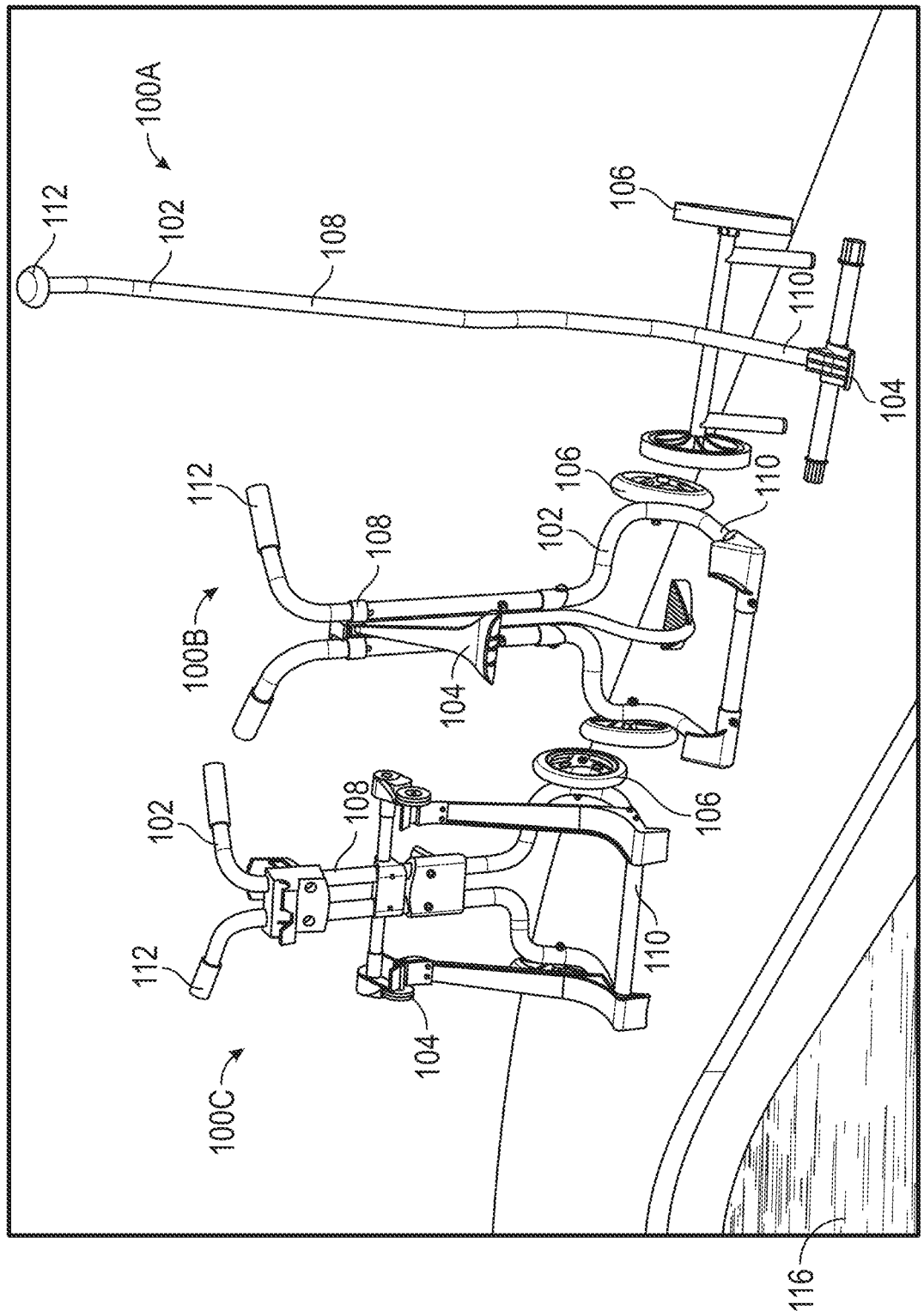
FIG. 1 illustrates a pool system with lift and extraction systems according to embodiments.
Figure 2:
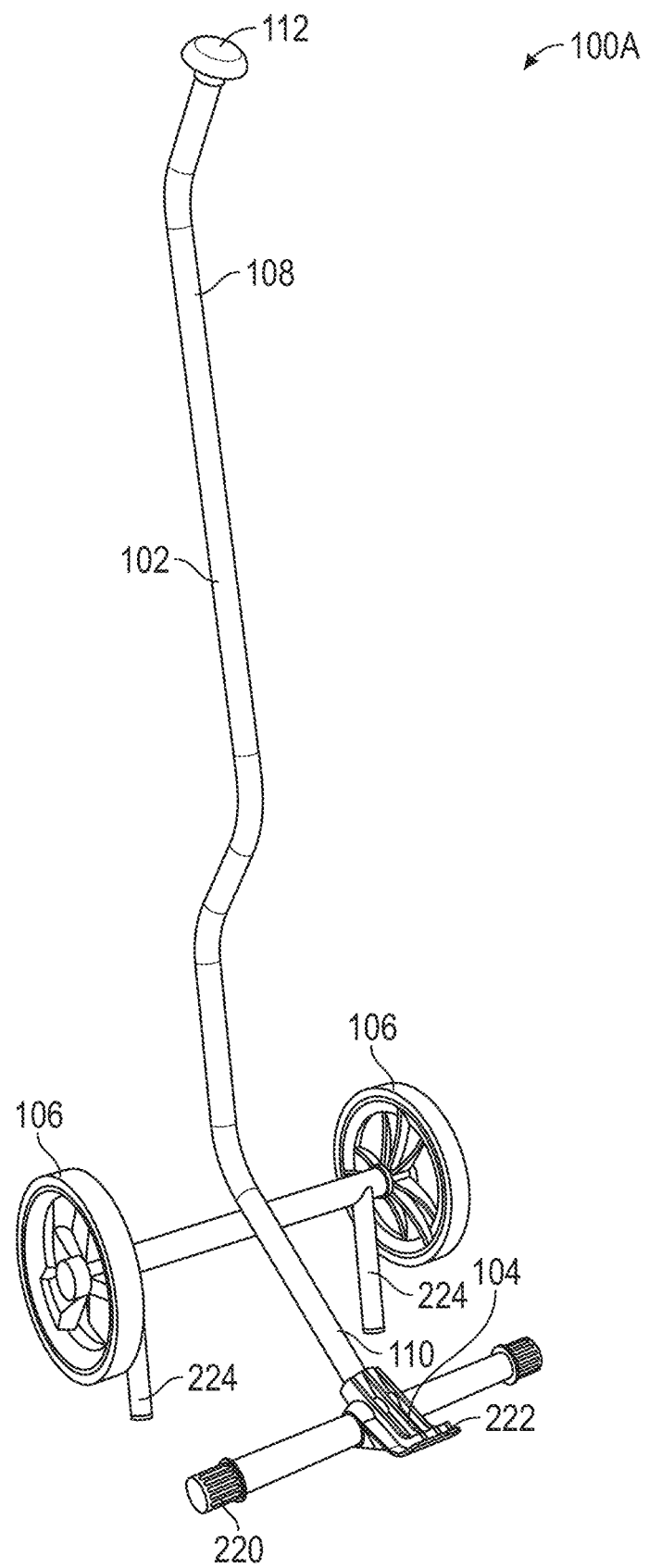
FIG. 2 illustrates one of the lift and extraction systems of FIG. 1.
Figure 4:
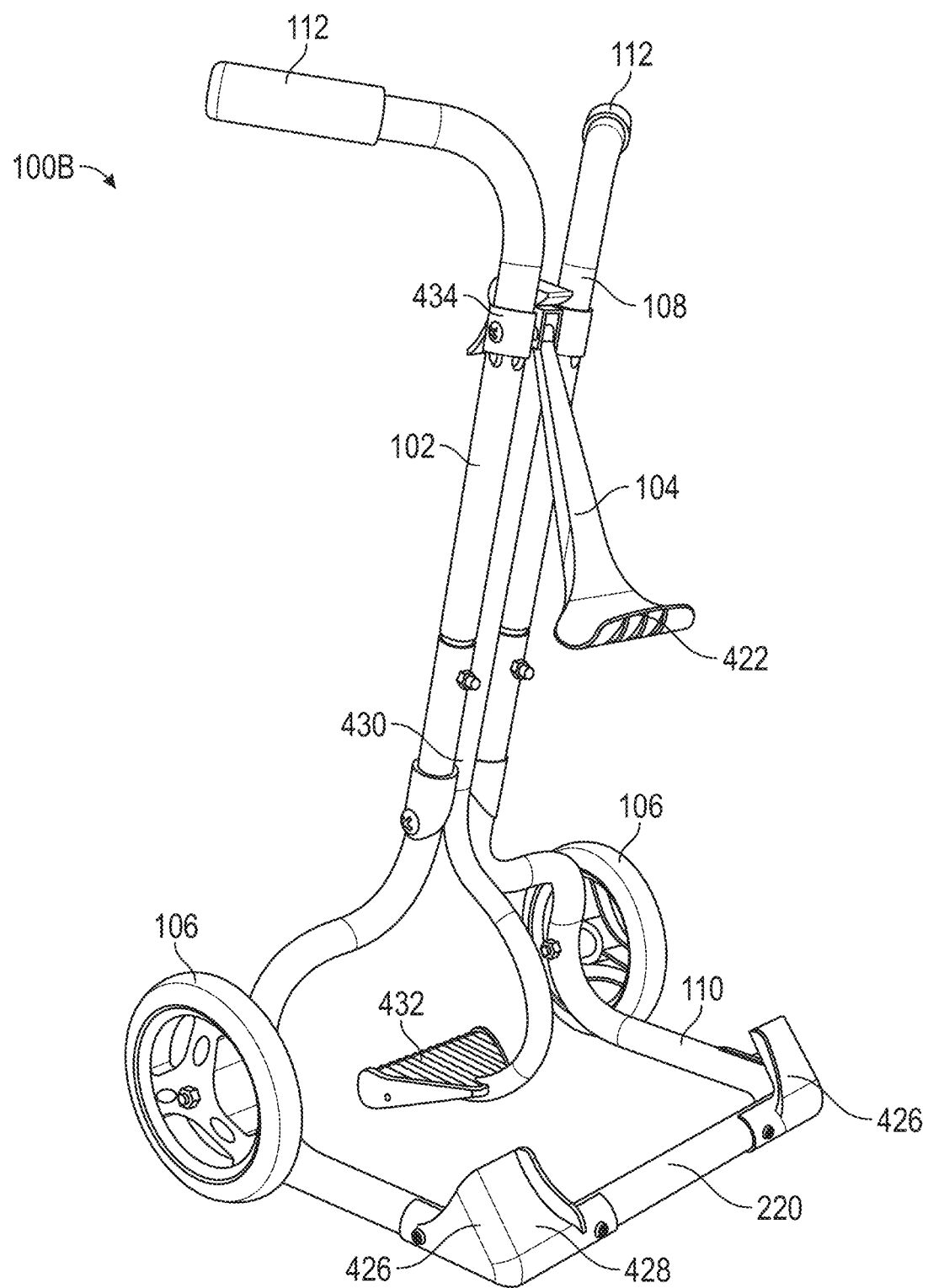
FIG. 4 illustrates one of the lift and extraction systems of FIG. 1.

FIG. 1 illustrates three exemplary lift systems 100A-C for extracting an APC 114 (see, e.g., FIG. 4) from a swimming pool 116 and/or deploying the APC 114 into the swimming pool 116 according to various embodiments.

The APC 114 may be an electric cleaner, a hydraulic cleaner, or other structure or piece of equipment as desired. The APC 114 generally includes motive elements 118 such that the APC 114 can move within the swimming pool 116. The APC 114 may have various components or features as desired, including but not limited to a controller (e.g., processor and/or memory), an accelerometer, communication modules (e.g., an antenna, sensor, lights, speakers, etc.), pumps, filters, combinations thereof, and/or other features and devices as desired, in some non-limiting examples, the APC 114 may include features similar to those discussed in U.S. Pat. No. 9,611,688, U.S. Patent Application Publication No. 2014/0137891, U.S. Pat. No. 8,771,504, and/or U.S. Pat. No. 9,250,626, each of which is hereby incorporated by reference in its entirety.

As illustrated in FIG. 1, each lift system 100A-C generally includes a frame 102, an engagement feature 104, and motive elements 106.

The frame 102 includes a back portion 108 and a base portion 110 extending forward from the back portion 108. Optionally, the back portion 108 includes one or more handle portions 112 that a user may selectively grip and/or otherwise engage. For example, the frame 102 of the lift system 100A includes a single handle portion 112, while the frame 102 of the lift systems 100B-C include two handle portions 112. Grip enhancement features including but not limited to friction coatings, rubber covers, ridges, etc. may optionally be provided on the handle portion(s) 112 to improve a user's engagement with the frame 102. Optionally, the handle portion(s) 112 are provided at a location on the back portion 108 opposite from the base portion 110, and optionally the handle portion(s) 112 may extend in a direction that is different from the direction of the base portion 110. The frame 102 may be constructed from various materials as desired, including but not limited to various metals, composites, and/or other suitable materials as desired.

The engagement feature 104 is supported on the frame 102 and selectively engages and positions the APC 114 relative to the frame 102. As discussed in detail below, the engagement feature 104 may be fixed relative to the frame 102 or the engagement feature 104 may be movable relative to the frame 102. The engagement feature 104 may be various suitable devices or mechanisms for selectively engaging APC 114, including but not limited to hooks, pins, clips, inserts, clasps, combinations thereof, and/or various other suitable features as desired.

The motive elements 106 are supported on the frame 102 and enable movement of the lift systems 100A-C. In the embodiments illustrated, the motive elements 106 are wheels provided on opposite sides of the frame 102, although other suitable motive elements may be used in other examples. In certain embodiments, the motive elements 106 are supported on the frame 102 proximate to a transition between the back portion 108 and the base portion 110 of the frame 102, although they need not be in other embodiments.

In some embodiments, the lift systems 100A-C are each configurable between a standing configuration and a mobile configuration. FIG. 1 illustrates the lift systems 100A-C in the standing configuration. As illustrated in this figure, in the standing configuration, the base portion 110 of the frame 102 may optionally contact a ground surface. In the standing configuration, the motive elements 106 may or may not contact the ground surface. For example, in FIG. 1, the motive elements 106 of the lift system 100A do not contact the ground in the standing configuration while the motive elements of the lift systems 100B-C do contact the ground in the standing configuration. In the mobile configuration, the base portions 110 may be spaced apart from the ground and/or otherwise not contact ground such that the lift systems 100A-C may be moved along the ground surface. In certain embodiments, and as discussed in detail below, in the mobile configuration, the motive elements 106 may contact the ground surface.

The lift system 100A is described in detail below with reference to FIGS. 2 and 3A-F, the lift system 100B is described in detail below with reference to FIGS. 4 and 5A-F, and the lift system 100C is described in detail below with reference to FIGS. 6 and 7A-F. In certain non-limiting examples, the lift system 100A may be an extraction system, and the lift systems 100B-C may be both extraction systems and storage systems, meaning that the APC 114 may be stored on the lift systems 100B-C as desired. The below embodiments should not be considered limiting, and lift systems according to the present invention may include various combinations of features and/or components as desired, including a combination or sub-combination of features illustrated with the lift systems 100A-C.

Referring to FIGS. 2 and 3A-F, the lift system 100A includes the base portion 110 with a support portion 220 that may selectively contact or otherwise engage the APC 114 when the APC 114 is lifted by the lift system 100A. As mentioned, in the embodiment illustrated, the lift system 100A includes one handle portion 112, although in other embodiments the lift system 100A may include any number of handle portions 112 as desired. Advantageously, the lift system 100A may have no moving parts for engaging the APC 114. In such embodiments, the entire lift system 100A may become a lever, and different angles of the lift system 100A relative to a pool deck may be used to determine cleaning engagement, levering of the APC 114 above water surface and the pool deck, and/or engagement of wheels of the lift system 100A with the pool deck for transporting the APC 114 to a storage location (e.g., garage, stowing trolley, etc.).

In the embodiment illustrated in FIGS. 2 and 3A-F, the engagement feature 104 of the lift system 100A is a hook 222 supported on the base portion 110 of the frame 102. In this embodiment, the hook 222 is supported on the base portion 110 opposite from the back portion 108, although the particular location of the hook 222 should not be considered limiting.

Optionally, and as illustrated in FIGS. 2 and 3A-F, the lift system 100A includes lifting members 224 extending from the frame 102. In various embodiments, the lifting members 224 may generally extend downwards from the base portion 110 of the frame 102. In certain embodiments, the lifting members 224 may lift the motive elements 106 off the ground surface when the lift system 100A is in the standing configuration (see, e.g., FIG. 2). In certain embodiments, the lifting members 224 may define a lever location facilitating movement of the lift system 100A between the standing configuration and the mobile configuration and vice versa. Optionally, the lifting members 224 may facilitate removal of the APC 114 from the pool 116 and/or deployment of the APC 114 into the pool 116 by providing a controlled and/or limited movement of the lift system 100A.

Referring to FIGS. 3A-F, a method of removing the APC 114 from the pool 116 using the lift system 100A will be discussed below. A method of deploying the APC 114 within the pool 116 using the lift system 100A may optionally be performed by reversing the steps illustrated in FIGS. 3A-F.

Figure 3A:
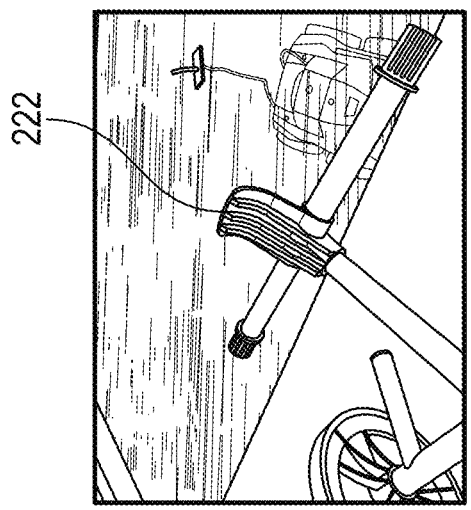
FIG. 3A-F illustrates steps for removing an APC from a pool using the lift and extraction system of FIG. 2.
Figure 3C:
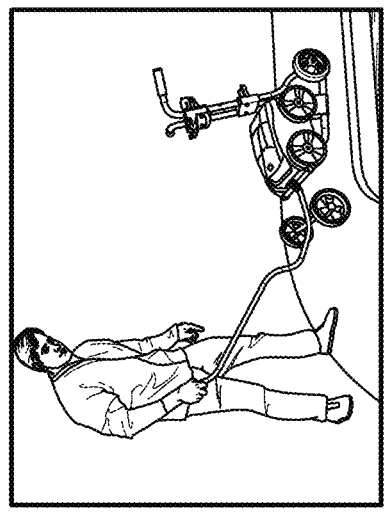
Figure 3B:
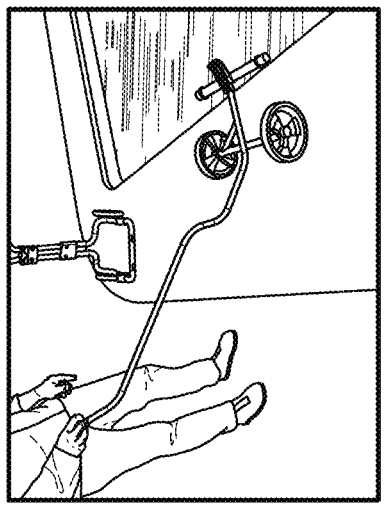
Figure 3E:
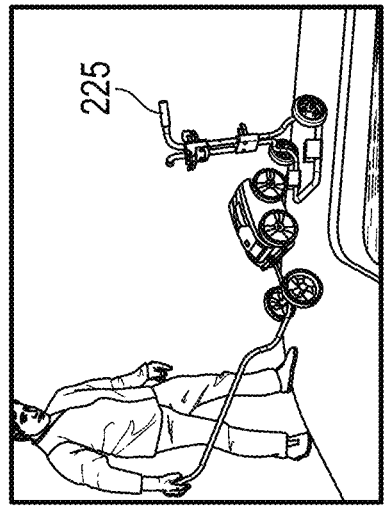
Figure 3D:
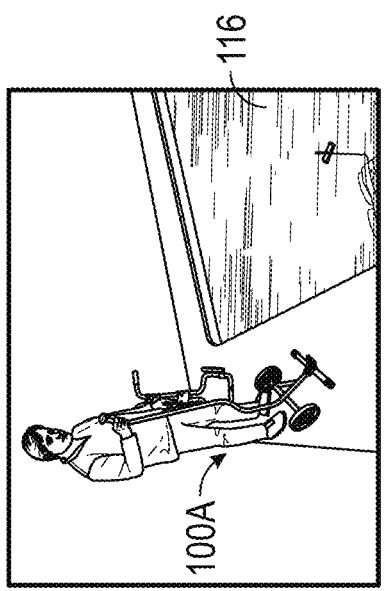
Figure 3F:
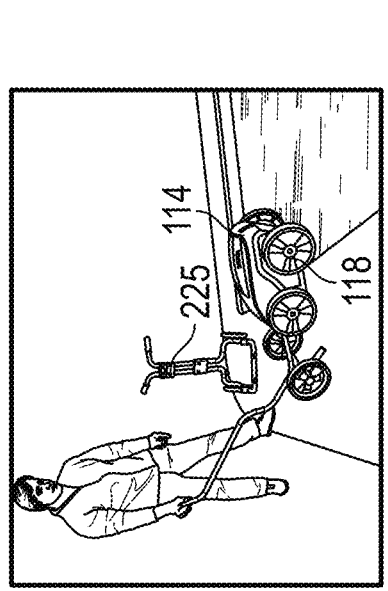

In certain embodiments, removing the APC 114 with the lift system 100A includes bringing the lift system 100A adjacent to the pool 116 (FIG. 3A) and moving (e.g., tilting) the lift system 100A relative to the pool 116 and/or the APC 114 (FIGS. 3B-C) such that the hook 222 engages a portion of the APC 114. In the embodiment illustrated, the hook 222 engages a handle of the APC 114. In some embodiments, moving the lift system 100A includes lowering the hook 222 at least partially into the pool 116 and/or pivoting the hook 222 downwards (FIG. 3C). Once the hook 222 is engaged with the APC 114, the user may move (e.g., tilt) the lift system 100A to lift the APC 114 out of the pool 116 (FIG. 3D), and optionally may use the lifting members 224 as levers to facilitate such tilting. In certain embodiments, the user may tilt the lift system 100A into the mobile configuration as illustrated in FIGS. 3D-E. In the mobile configuration, the user may move or position the APC 114 as desired. In the embodiment illustrated in FIG. 3F, the lift system 100A is used to lift the APC 114 from the pool 116 and onto a storage trolley 225.

Referring to FIGS. 4 and 5A-F, the lift system 100B may be similar to the lift system 100A where the base portion 110 of the frame 102 includes the support portion 220. However, compared to the lift system 100A, the base portion 110 additionally includes cleaner supports 426 for at least partially supporting the APC 114 on the frame 102. In the embodiment illustrated and as discussed in detail below, the cleaner supports 426 may at least partially engage the motive elements 118 of the APC 114 to further support and position the APC 114 relative to the frame 102. In certain embodiments, the cleaner supports 426 each include a support surface 428 extending at an oblique angle relative to the base portion such that in the standing configuration, the APC 114 is angled relative to the ground surface. However, in other embodiments, the support surfaces 428 may extend at any angles as desired and/or may have various shapes or profiles as desired.

Similar to the lift system 100A, the engagement feature 104 of the lift system 100B includes a hook 422; however, compared to the fixed hook 222 of the lift system 100A, the hook 422 is movable relative to the frame 102 such that a position and orientation of the hook 422 relative to the frame 102 is adjustable. In certain embodiments, and as best illustrated in FIGS. 5A-F, the hook 422 may be supported on a lever arm 430 that is pivotably supported on the frame 102. In some embodiments, the hook 422 may be pivotable and/or movable relative to the lever arm 430.

Figure 5A:
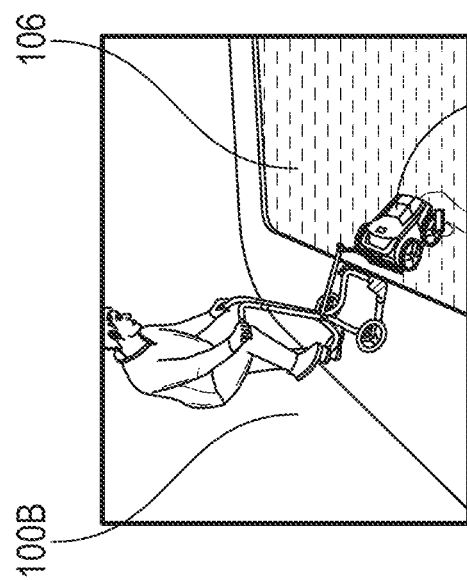
FIG. 5A-F illustrates steps for removing an APC from a pool using the lift and extraction system of FIG. 4.
Figure 5B:
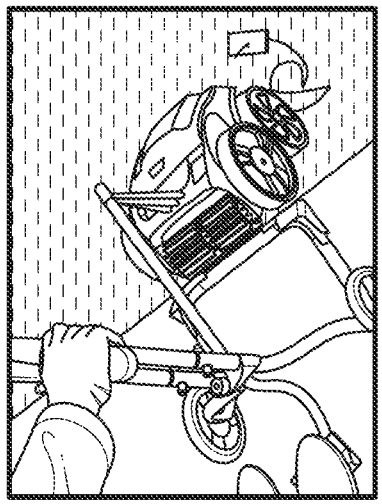
Figure 5C:
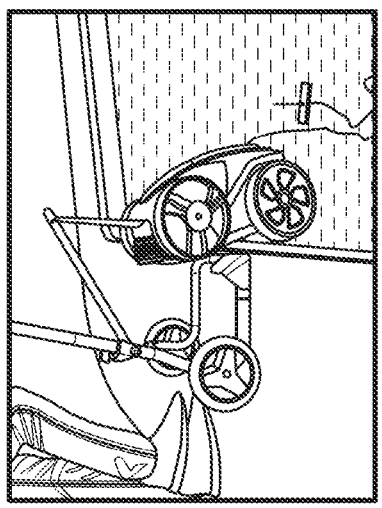

The lever arm 430 may be movable relative to the frame 102 between a stowed position (see FIG. 4) and a deployed position (see, e.g., FIGS. 5A-C). In certain embodiments, the lever arm 430 includes a pedal portion 432 that a user may engage with her or his foot to move the lever arm 430 relative to the frame 102 between the stowed and deployed positions. However, in other embodiments, the pedal portion 432 may be omitted and/or the lever arm 430 may be movable between the stowed position and the deployed position using a motor and/or other automatic features as desired. Optionally, a latch 434 or other suitable engagement feature may selectively engage and/or retain the lever arm 430 when it is moved to the stowed position.

Referring to FIGS. 5A-F, a method of removing the APC 114 from the pool 116 using the lift system 100B will be discussed below. A method of deploying the APC 114 within the pool 116 using the lift system 100B may optionally be performed by reversing the steps illustrated in FIGS. 5A-F.

Figure 5D:
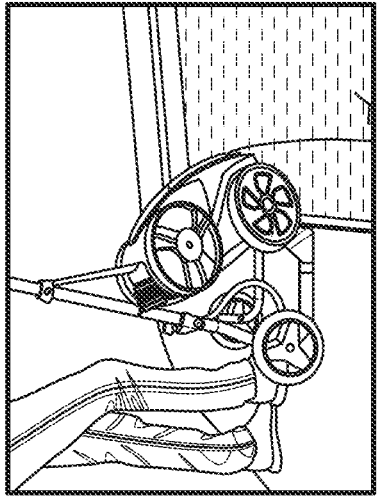
Figure 5E:
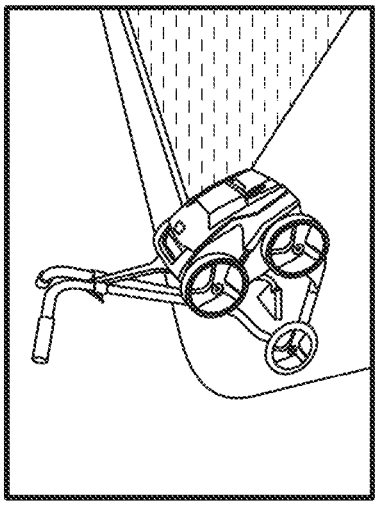
Figure 5F:
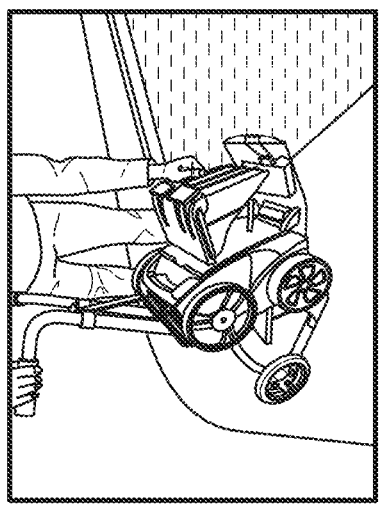

The method may include moving the lever arm 430 from the stowed position to the deployed position (FIG. 5A). Optionally, the method may include releasing the latch 434 such that the lever arm 430 may be moved to the deployed position. The user may use the pedal portion 432 to change the orientation of the lever arm 430 relative to the frame 102, including lowering the hook 422 to engage the APC 114 (FIG. 5A). In the embodiment illustrated, the lift system 100B is moved such that the hook 422 engages the handle of the APC 114 (FIG. 5B). The method may include the user pressing down on the pedal portion 432 to lift the APC 114 (FIGS. 5C-D). Optionally, the pedal portion 432 may be pressed until the lever arm 430 is rotated back to the stowed position and/or the latch 434 engages the lever arm 430 (FIG. 5D). As illustrated in FIG. 5E, for example, rotating the lever arm 430 to the stowed position may both lift the APC 114 and position a portion of the APC 114 (e.g., the motive elements 118) on the support surfaces 428 of the cleaner supports 426. Such engagement may position the APC 114 relative to the frame 102 and may support the APC 114 in an orientation and/or configuration facilitating engagement and/or inspection of the APC 114 (FIG. 5E). As an example, and as illustrated in FIG. 5F, the APC 114 may be angled to facilitate access to a filter basket and/or another component of the APC 114 as desired.

Referring to FIGS. 6 and 7A-F, the lift system 100C is similar to the lift system 100B and includes the support portion 220 of the base portion 110 of the frame 102 as well as cleaner supports 626. The cleaner supports 626 are similar to the cleaner supports 426 except that the cleaner supports 626 extend from the base portion 110 to the back portion 108 of the frame 102, and the support surfaces 628 of the cleaner supports 626 have an arcuate profile. In some embodiments, the cleaner supports 626 may optionally be movable relative to the frame 102. As a non-limiting example, the cleaner supports 626 may be pivotably or hingedly attached to the frame 102 such that they can be tilted forward or backwards as desired, which may facilitate positioning of the APC 114 on the lift system 100C. Optionally, the cleaner supports 626 include a bumper 642 that provides a stop and/or otherwise contacts the APC 114 to limit movement of the APC 114 on the lift system 100C.

Figure 6:
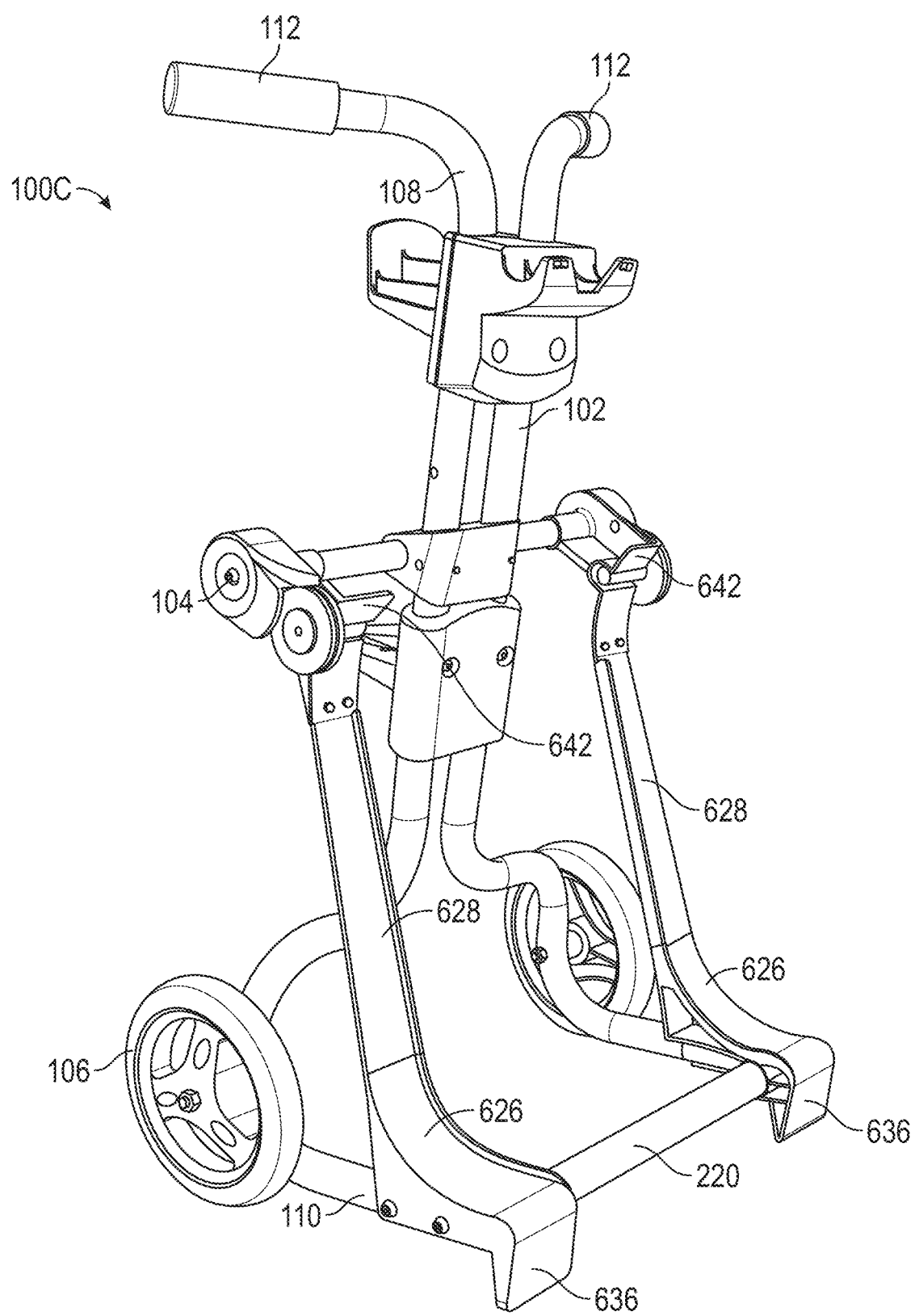
FIG. 6 illustrates one of the lift and extraction systems of FIG. 1.

Optionally, and as best illustrated in FIG. 6, the cleaner supports 626 may include positioning features 636 for facilitating positioning of the lift system 100C relative to the pool 116. In the embodiment illustrated, the positioning features 636 are hooks for engaging a side of the pool 116, although other suitable positioning features may be used as desired. Moreover, while illustrated on the cleaner supports 626, the positioning features 636 may be provided at other locations as desired.

Similar to the lift system 100B, the engagement feature 104 of the lift system 100C is movable relative to the frame 102. However, compared to the lift system 100A and 100B and as best illustrated in FIGS. 7A-F, the engagement feature 104 of the lift system 100C is an engagement device 638 supported on a retractable wire 640, and the engagement device 638 is movable between a deployed position and a stowed position by controlling a length of the wire 640. In this embodiment, the engagement device 638 may engage a portion of the APC 114, including but not limited to a motive element 118 of the APC 114. In some embodiments, the engagement devices 638 may engage axially with wheels of the APC 114. The engagement device 638 may be various mechanisms or devices suitable for engaging the APC 114, including but not limited to magnetic latches, inserts, clips, hooks, snap fit connections, pins, rods, combinations thereof, and/or other suitable devices or mechanisms or desired.

The length of the wire 640 may be controlled via a controller and/or a motor as desired, and/or may be controlled manually by the user. In some embodiments, the wire 640 or other suitable cabling may be retractable. In other embodiments, the wire 640 may be omitted, and other devices or mechanisms may be utilized to facilitate movement of the engagement feature 104, including but not limited to pivoting mechanisms, telescoping members, expandable or collapsible members, and/or other mechanisms as desired. Moreover, other types of engagement features 104 may be provided on the retractable wire 640 and/or movement mechanisms in place of the engagement device 638, and the engagement device 638 should not be considered limiting.

Referring to FIGS. 7A-F, a method of removing the APC 114 from the pool 116 using the lift system 100C will be discussed below. A method of deploying the APC 114 within the pool 116 using the lift system 100C may optionally be performed by reversing the steps illustrated in FIGS. 7A-F.

Figure 7C:
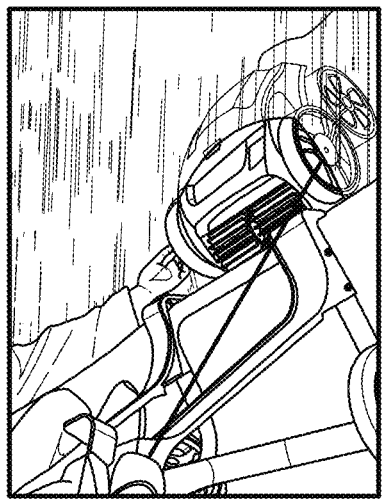
FIG. 7A-F illustrates steps for removing an APC from a pool using the lift and extraction system of FIG. 6.
Figure 7F:
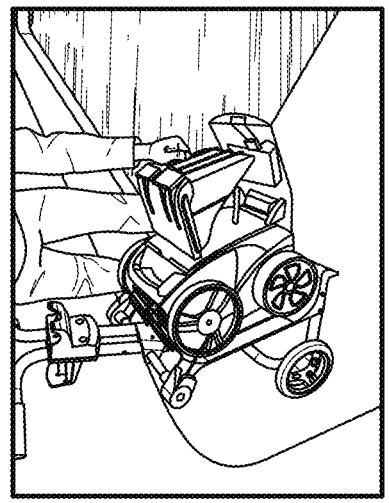
Figure 7B:
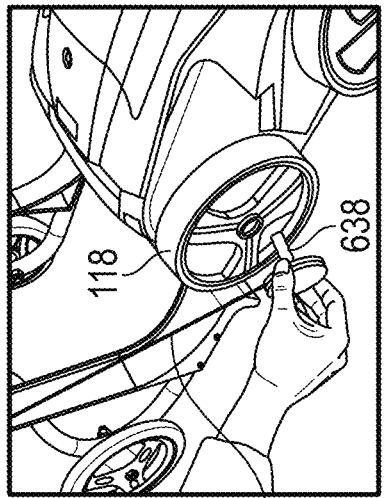
Figure 7E:
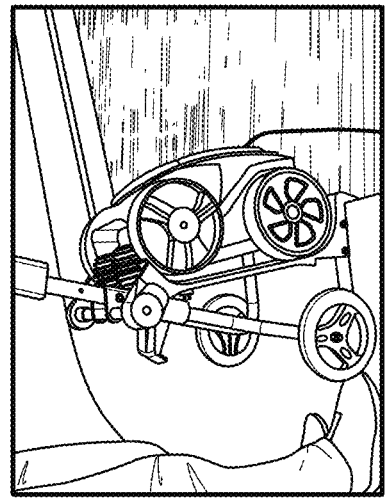
Figure 7A:
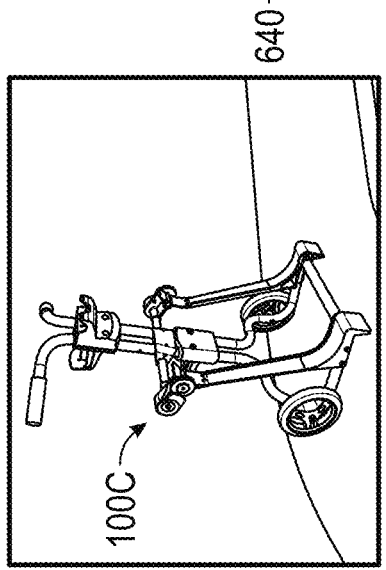

The method may include moving the engagement device 638 to the deployed position by unwinding the wire 640 and engaging the engagement device 638 (or other component of the lift system 100C) with the APC 114 (FIGS. 7A-B). In some optionally embodiments, engaging the engagement device 638 with the APC 114 includes inserting the engagement device 638 into the motive elements 118 and/or by magnetically latching the engagement device 638 with the motive elements 118; however, in other embodiments, the engagement device 638 and/or other component of the lift system 100C may engage the APC 114 in other manners as desired, and it need not be inserted into the APC 114 for engagement.

Figure 7D:
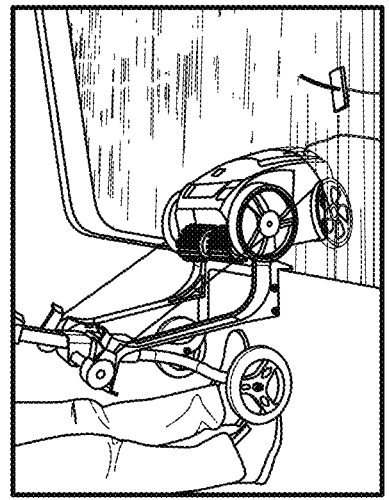

The method may include retracting the wire 640 to move the engagement device 638 towards the stowed position, which in turn may lift the APC 114 out of the pool 116 (FIGS. 7C-D). Retracting the wire 640 may pull the APC 114 onto the cleaner supports 626 (FIGS. 7D-E). Optionally, the wire 640 is retracted until the APC 114 abuts the bumpers 642 (FIG. 7E).

Optionally, in other embodiments, the APC 114 need not rely on a pulling force from the wire 640 and/or the APC 114 is the primary pulling force and the wire 640 provides a secondary pulling force. In some embodiments, the APC 114 may drive itself forward while engaged with the engagement device 638 (or other component of the lift system 110C) to pull itself out of the pool 116 via the wire 640 (e.g., by driving the motive elements). In this way, a drive motor of the APC 114 itself pulls the APC 114 out of the pool 116. In some embodiments, the motive elements of the APC 114 may be the means by which the APC 114 lifts itself out of the pool, rolling up the wire 640 onto the engaged wheel pulley, drawing the APC 114 onto the lift system 100C at a signal from the operator. In certain embodiments, a controller and/or sensors of the APC 114 may be used to control the lift so as to draw out the APC 114 evenly and to stop when at the home position on the lift system 100C.

In some embodiments, the drive motor of the APC 114 may continue driving the APC 114 to pull itself out of the pool until the APC 114 abuts the bumpers 642. In these embodiments, the APC 114 may detect abutment with the bumpers 642 and/or positioning on the cleaner supports 626 and may stop driving the APC 114 responsive to such a detection. In various embodiments, the APC 114 may make such a detection based on a power level required by the APC 114 exceeding a certain threshold, sensors such one or more of touch sensors, tilt sensors, angle sensors, and/or other sensors, and/or various other devices or mechanisms as desired. Similar to the lift system 100B, when the APC 114 is extracted from the pool using the lift system 100C, the APC 114 may be positioned relative to the frame 102 and may be supported in an orientation and/or configuration facilitating engagement and/or inspection of the APC 114. As an example, and as illustrated in FIG. 7F, the APC 114 may be angled to facilitate access to a filter basket and/or another component of the APC 114 as desired.

Figure 8:
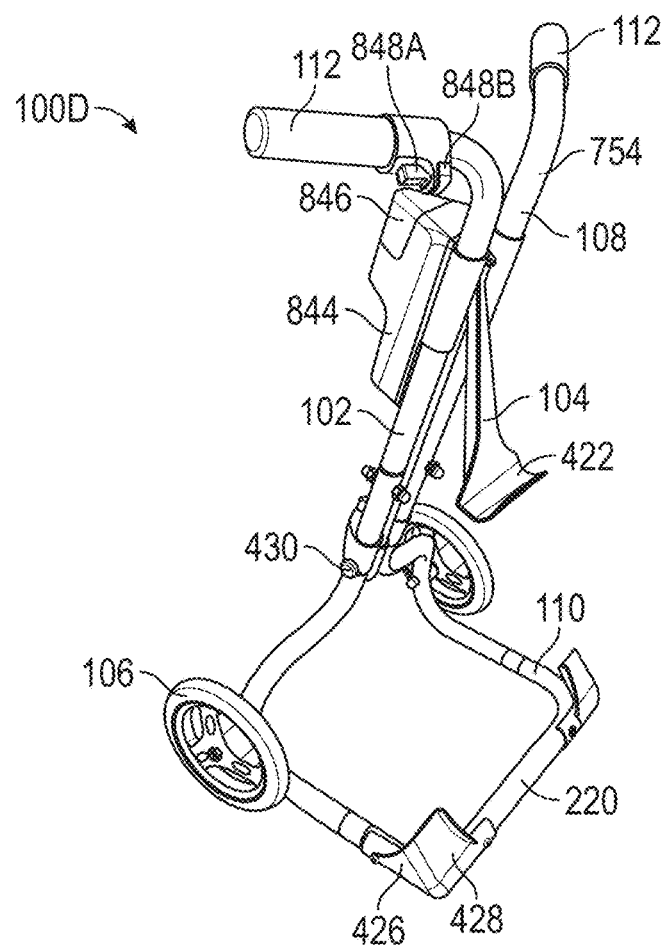
FIG. 8 illustrates a lift and extraction system according to embodiments.
Figure 9:
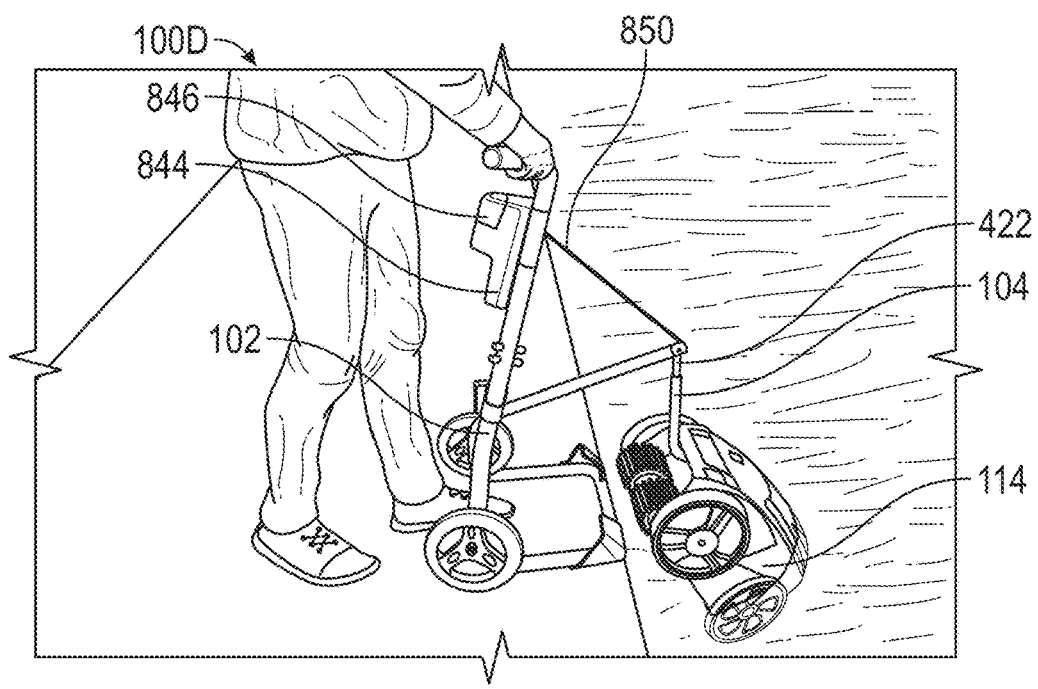
FIG. 9 illustrates the lift and extraction system of FIG. 8 removing an APC from a pool.

FIGS. 8 and 9 illustrate another non-limiting example of a lift and extraction system 100D) according to embodiments. The lift and extraction system 100D is similar to the lift and extraction system 100B except that the lift and extraction system 100D includes a motor 844 in place of the pedal portion 432. In this manner, the lift and extraction system 100D may be fully automatic and hands-free while using the hook 422 (or other suitable engagement feature 104).

The motor 844 may be supported on the frame 102. In certain embodiments, the motor 844 includes a power source, such as but not limited to one or more batteries. Optionally, batteries and/or other power sources may be removable from the motor 844 (e.g., for recharging, replacement, maintenance, etc.).

In various embodiments, the motor 844 may control a position or orientation of the lever arm 430 relative to the frame 102 and/or a position or orientation of the hook 422 relative to the lever arm 430. In various embodiments, the motor 844 is coupled to at least the lever arm 430 using various devices or mechanisms as desired, such as but not limited to a wire 850 (see FIG. 9). In the embodiment illustrated, the motor 844 independently controls both the lever arm 430 and the hook 422. In this embodiment, a first switch 848A may be selectively engaged to control the position of the lever arm 430, and a second switch 848B may be selectively engaged to control the position of the hook 422. In other embodiments, the motor 844 may jointly control the lever arm 430 and the hook 422 (e.g., the hook 422 may automatically deploy as the lever arm 430 is lowered). In another non-limiting example, the hook 422 and/or the lever arm 430 need not be controlled by the motor 844.

Optionally, the motor 844 may include a safety mechanism. As a non-limiting example, the motor 844 may include a ratchet safety mechanism allowing for movement of the lever arm 430 and/or the hook 422 in a single direction while minimizing or preventing movement in an opposite direction. As a non-limiting example, the ratchet safety mechanism may be utilized when lifting the APC 114 out of the pool such that movement of the lever arm 430 is limited to a stowing movement (e.g., towards the frame 102), and a deploying movement (e.g., towards or into the pool) is minimized or prevented. Other types of safety mechanisms may be utilized as desired.

Exemplary concepts and combinations of features of the invention may include:

A. A lift system for an automatic swimming pool cleaner, the lift system comprising a frame, an engagement feature supported on the frame and configured to selectively engage the automatic swimming pool cleaner and position the automatic swimming pool cleaner relative to the frame, and motive elements on the frame.

B. The lift system according to statement A., wherein the lift system is configurable between a mobile configuration and a standing configuration, wherein, in the standing configuration, a portion of the frame is configured to contact a ground surface, and wherein in the mobile configuration, the frame does not contact the ground surface and the motive elements are configured to contact the ground surface.

C. The lift system according to statement B., wherein in the standing configuration, the motive elements do not contact the ground surface.

D. The lift system according to statement B., wherein the motive elements are configured to contact the ground surface in both the standing configuration and the mobile configuration.

E. The lift system according to any one of statements A.-D., wherein the engagement feature is fixed relative to the frame.

F. The lift system according to any one of statements A.-D., wherein the engagement feature is movable relative to the frame.

G. The lift system according to any one of statements A.-F., wherein the engagement feature comprises a hook.

H. The lift system according to statements A. or F., wherein the engagement feature comprises an insert supported on a retractable wire.

I. The lift system according to any one of statements A.-H., wherein the frame comprises a back portion and a base portion extending forward from the back portion.

J. The lift system according to any one of statements A.-I., further comprising a cleaner support supported on the frame, the cleaner support configured to at least partially support the automatic swimming pool cleaner.

K. The lift system according to statement J., wherein the cleaner support is on the base portion of the frame.

L. The lift system according to statement J., wherein the cleaner support extends from the base portion of the frame to the back portion of the frame.

M. A lift system for an automatic swimming pool cleaner, the lift system comprising a frame and a lever arm supported on the frame, wherein the lever arm comprises a foot pedal and an engagement feature opposite the foot pedal, and wherein the lever arm is pivotable relative to the frame such that the engagement feature selectively engages the automatic swimming pool cleaner and positions the automatic swimming pool cleaner relative to the frame.

N. The lift system according to statement M., further comprising a latch on the frame configured to selectively engage the lever arm.

O. The lift system according to statement M. or N., wherein the engagement feature is pivotable relative to the lever arm.

P. The lift system according to any one of statements M.-O., wherein the engagement feature is a hook.

Q. The lift system according to any one of statements M.-P., wherein the foot pedal is configured to move the lever arm between a stowed position and a deployed position based on engagement of a user with the foot pedal.

R. A lift system for an automatic swimming pool cleaner, the lift system comprising a frame and a lever arm pivotably supported on the frame, wherein the lever arm comprises a foot pedal and an engagement feature opposite the foot pedal, the engagement feature configured to selectively engage the automatic swimming pool cleaner, and wherein engagement of the foot pedal pivots the lever arm relative to the frame between a stowed position and a deployed position.

S. The lift system according to statement R., further comprising a latch on the frame configured to selectively engage the lever arm in the stowed position.

T. The lift system according to statement R. or S., wherein the engagement feature is pivotable relative to the lever arm.

U. The lift system according to any one of statements R.-T., wherein the engagement feature is configured to engage the automatic swimming pool cleaner when the lever arm is in the deployed position.

V. A method of using a lift system according to any one of statements A.-U., wherein the automatic swimming pool cleaner engages with the lift system such that a drive motor of the automatic swimming pool cleaner lifts the automatic swimming pool cleaner out of a swimming pool.

W. A lift system for an automatic swimming pool cleaner, the lift system comprising a frame and a lever arm supported on the frame, wherein an end of the lever arm comprises an engagement feature, and wherein the lever arm is pivotable relative to the frame such that the engagement feature selectively engages the automatic swimming pool cleaner and positions the automatic swimming pool cleaner relative to the frame.

X. The lift system according to statement W., wherein the lever arm is movable using an actuation mechanism.

Y. The lift system according to statement X., wherein the actuation mechanism comprises a foot pedal or an automatic actuation mechanism.

Z. The lift system according to statement Y., wherein the automatic actuation mechanism comprises a motor and/or other suitable automatic features.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The foregoing is provided for purposes of illustrating, explaining, and describing embodiments of the present invention. Modifications and adaptations to these embodiments will be apparent to those skilled in the art and may be made without departing from the scope of the invention. Additionally, the word "pool" and phrase "swimming pool" as used herein may also refer to spas or other water containing vessels or structures used for recreation or therapy, including both artificial and natural vessels, structures, and the like.

That which is claimed:

1. A lift system for an automatic swimming pool cleaner, the lift system comprising:
    a frame comprising a back portion and a base portion, wherein the base portion extends in a forward direction relative to the back portion;
    one or more cleaner supports extending from the back portion to the base portion of the frame, each of the one or more cleaner supports comprising a support surface configured to support the automatic swimming pool cleaner at an incline relative to the back portion and the base portion;

an engagement system supported on the frame and configured to selectively engage the automatic swimming pool cleaner and position the automatic swimming pool cleaner relative to the frame, the engagement system comprising a retractable wire and an engagement device on the retractable wire, wherein the engagement device is movable relative to the frame via the retractable wire, and wherein the engagement device is configured to selectively engage the automatic swimming pool cleaner; and motive elements on the frame.

2. The lift system of claim 1, wherein the frame comprises a back portion and a base portion extending forward from the back portion.

3. The lift system of claim 1, wherein retraction of the wire is configured to at least partially lift the automatic swimming pool cleaner out of a swimming pool.

4. A lift system for an automatic swimming pool cleaner, the lift system comprising:

a frame; and a lever arm supported on the frame and pivotable relative to the frame, wherein the lever arm comprises a foot pedal and an engagement feature opposite the foot pedal, wherein the engagement feature is configured to engage the swimming pool cleaner, and wherein the lever arm is pivotable relative to the frame such that the engagement feature and the foot pedal are positionable relative to the frame.

5. The lift system of claim 4, further comprising a latch on the frame configured to selectively engage the lever arm.

6. The lift system of claim 4, wherein the engagement feature is pivotable relative to the lever arm.

7. The lift system of claim 4, wherein the foot pedal is configured to move the lever arm between a stowed position and a deployed position based on engagement of a user with the foot pedal.

8. A lift system for an automatic swimming pool cleaner, the lift system comprising:

a frame; and a lever arm supported on the frame and pivotable relative to the frame, wherein an end of the lever arm comprises an engagement feature, and wherein the lever arm is pivotable relative to the frame such that the engagement feature is positionable relative to the frame.

9. The lift system of claim 8, wherein the lever arm is movable using an actuation mechanism.

10. The lift system of claim 8, wherein the actuation mechanism comprises a foot pedal or an automatic actuation mechanism.

11. The lift system of claim 10, wherein the automatic actuation mechanism comprises a motor.

12. The lift system of claim 8, further comprising motive elements on the frame.

\* \* \* \* \*